United States Patent [19]
Geiger et al.

[11] Patent Number: 5,195,104
[45] Date of Patent: Mar. 16, 1993

[54] INTERNALLY STIMULATED OPTICAL PARAMETRIC OSCILLATOR/LASER

[75] Inventors: Allen R. Geiger; Narasimha S. Prasad, both of Las Cruces, N. Mex.

[73] Assignee: Lasen, Inc., Las Cruces, N. Mex.

[21] Appl. No.: 777,705

[22] Filed: Oct. 15, 1991

[51] Int. Cl.$^5$ .......................... H01S 3/081; H03F 7/00
[52] U.S. Cl. ........................................ 372/97; 372/10; 372/20; 372/98; 372/70; 372/21; 372/22; 372/99; 359/330; 359/334; 359/346; 359/345
[58] Field of Search .................. 372/10, 18, 20, 21, 372/34, 39, 40, 69, 70, 92, 93, 97, 98, 99, 108, 22; 359/333, 334, 330, 338, 340, 342, 346, 345

[56] References Cited

U.S. PATENT DOCUMENTS

| | | | |
|---|---|---|---|
| 3,609,389 | 9/1971 | Bjorkholm | 307/88.3 |
| 3,628,186 | 12/1971 | Ashkin | 331/107 R |
| 3,644,845 | 2/1972 | Harris | 331/175 |
| 3,662,183 | 5/1972 | Ashkin et al. | 307/88.3 |
| 4,085,335 | 4/1978 | Guilino | 307/88.3 |
| 4,143,338 | 3/1979 | Godard et al. | 331/94.5 C |
| 4,180,751 | 12/1979 | Ammann | 307/428 |
| 4,189,652 | 2/1980 | Levinos et al. | 307/428 |
| 4,200,808 | 4/1980 | Herbst | 307/425 |
| 4,349,907 | 9/1982 | Campillo et al. | 372/92 |
| 4,405,869 | 9/1983 | May | 307/405 |
| 4,639,923 | 1/1987 | Tang et al. | 372/21 |
| 4,696,012 | 9/1987 | Harshaw | 372/99 |
| 4,739,507 | 4/1988 | Byer et al. | 372/22 |
| 4,807,240 | 2/1989 | Goldstone | 372/69 |
| 4,897,562 | 1/1990 | Krasinski et al. | 307/427 |
| 5,028,816 | 7/1991 | Boczar | 307/428 |
| 5,033,057 | 7/1991 | Bosenberg et al. | 372/72 |
| 5,034,951 | 7/1991 | Edelstein et al. | 372/22 |
| 5,038,352 | 8/1991 | Lenth et al. | 372/21 |
| 5,038,359 | 8/1991 | Pepper et al. | 372/99 |
| 5,053,641 | 10/1991 | Cheng et al. | 359/330 |
| 5,070,260 | 12/1991 | Wong | 359/330 |
| 5,079,445 | 1/1992 | Guyer | 359/330 |
| 5,088,096 | 2/1992 | Pocholle et al. | 372/20 |
| 5,132,977 | 7/1992 | Zayhowski et al. | 372/97 X |

OTHER PUBLICATIONS

W. Brunner et al., "Theory of Optical Parametric Amplification and Oscillation", Progress in Optics, vol. XV, North-Holland Publishing Company, 1977, pp. 44–49.

Cordova-Plaza et al. "Miniature CW and Active Internally Q-Switched Nd:MgO:LiNbO3 Lasers", IEEE Journal of Quantum Electronics, vol. QE-23, No. 2, Feb. 1987, pp. 262-266.

Cordova-Plaza et al., "Nd:MgO:LiNbO3 spectroscopy and laser devices", J. Opt. Soc. Am. B, vol. 3, No. 1, Jan. 1986, pp. 13-14.

*Primary Examiner*—Brian Healy
*Attorney, Agent, or Firm*—Kramer, Brufsky & Cifelli

[57] ABSTRACT

An optical parametric oscillator/laser system includes an optical pump source for generating pump radiation and an embedded dual optical resonator containing an optical parametric oscillator/laser crystal. The embedded dual optical resonator includes a laser resonator and an optical parametric oscillator resonator. The OPOL crystal is an optical parametric oscillator material doped with ions that exhibit lasing transitions. The pump radiation stimulates generation of laser radiation. When the laser radiation reaches the parametric threshold, optical parametric radiation is generated. In one embodiment, the laser resonator and the OPOL resonator are each defined by spaced-apart mirrors. In another embodiment, the OPOL system includes an OPOL rod having end caps at each end. Each end cap includes surfaces for internally reflecting the laser radiation and the parametric optical radiation in a closed loop path so that the OPOL rod and the end caps define an optical resonator. The parametric radiation of the OPOL system is tunable over a broad wavelength range.

34 Claims, 11 Drawing Sheets

INTERNALLY STIMULATED OPTICAL PARAMETRIC OSCILLATOR/LASER

FIELD OF THE INVENTION

This invention relates to optical parametric oscillator/laser systems wherein laser radiation and parametric optical radiation are generated in an embedded dual optical resonator. The parametric radiation is tunable over a broad wavelength range.

BACKGROUND OF THE INVENTION

A significant drawback of most lasers is that they are tunable, at most, over a very limited wavelength range. This drawback is overcome to some extent by optical parametric oscillator systems which are used to generate secondary (parametrically generated) radiation from monochromatic coherent primary radiation by means of parametric interaction with an optically nonlinear medium. In the optical parametric process, primary incident radiation having a known frequency propagates through a nonlinear medium and is converted into secondary radiation at two lower frequencies (longer wavelengths). The secondary or parametric radiation has two components, typically referred to as a signal wavelength and an idler wavelength. The secondary components can be adjusted in wavelength by a suitable tuning arrangement, typically by rotation of the optically nonlinear medium within the optical resonator of the parametric system. The optical parametric system can be used in combination with a coherent source of primary optical radiation such as a laser to provide a source of optical radiation whose wavelength can be varied within a prescribed frequency range.

A tunable optical system including a laser and a separate optical parametric oscillator is relatively complex and expensive. In the optical parametric oscillator, the nonlinear medium is typically located within an optical resonator formed by mirrors so that the radiation passes repeatedly through the nonlinear medium. Since laser radiation must be coupled into the optical resonator, mirrors which are highly transmissive for the primary laser radiation and highly reflective for the secondary parametric radiation must be used. This requirement is difficult to meet when the wavelength of the secondary radiation is to be continuously tunable, since the mirrors must be highly reflective at a wavelength that is close to the wavelength of the primary radiation. The mirrors should exhibit high reflectivity over a wide range of wavelengths. Even the most highly developed dichroic mirrors made of multiple dielectric layers only partially meet this requirement and then at great cost.

A triply resonant optical parametric oscillator is described by W. Brunner et al in "Theory of Optical Parametric Amplification and Oscillation", *Progress in Optics*, Vol. XV, North-Holland, 1977, pp 44–49. An internally Q-switched, solid state laser is described by Cordova-Plaza et al in *IEEE Journal of Quantum Electronics*, Vol. QE-23, No. 2, February 1987, pp. 262–266.

It is a general object of the present invention to provide optical parametric oscillator/laser systems.

It is another object of the present invention to provide a tunable source of coherent optical radiation.

It is a further object of the present invention to provide an optical source wherein laser radiation and optical parametric radiation are generated in an embedded dual optical resonator.

It is a further object of the present invention to provide an optical source wherein laser radiation and optical parametric radiation are generated within a single nonlinear optical medium.

It is another object of the present invention to provide a triply resonant optical parametric oscillator/laser system.

SUMMARY OF THE INVENTION

According to the present invention, these and other objects and advantages are achieved in an optical parametric oscillator/laser system comprising an optical pump source for generating pump radiation, an embedded dual optical resonator comprising a laser resonator and an optical parametric oscillator resonator, the laser resonator and the optical parametric oscillator resonator being coaxial and having a common cavity region, and an optical parametric oscillator/laser (OPOL) material coaxially disposed within the common cavity region of the laser resonator and the optical parametric oscillator resonator. The OPOL material is responsive to the pump radiation to generate laser radiation and is responsive to the laser radiation to generate parametric optical radiation.

The laser resonator is defined between spaced apart first and second laser mirrors. The optical parametric oscillator resonator is defined between spaced-apart first and second optical parametric oscillator (OPO) mirrors. In a first embodiment, the optical parametric oscillator resonator is disposed within the laser resonator. In a second embodiment, the laser resonator is disposed within the optical parametric oscillator resonator. The optical parametric oscillator/laser typically includes means for Q-switching of the laser resonator and electronic control means for synchronizing the laser pump source and the means for Q-switching. The OPOL system generates a laser wavelength, an OPO signal wavelength and an OPO idler wavelength. The OPOL material typically comprises an optical parametric oscillator crystal doped with ions which exhibit lasing transitions.

According to an important feature of the invention, the optical parametric oscillator/laser system includes means for tuning the OPOL material so as to vary the wavelength of the parametric optical radiation. According to a first tuning technique, the tuning means comprises means for thermal control of the OPOL material. According to a second tuning technique, the tuning means includes means for totaling the OPOL material about an axis perpendicular to the optical axis of the dual optical resonator. According to a third tuning technique, the tuning means comprises a polarizer disposed in the laser resonator and means for rotating the OPOL material about the optical axis of the embedded dual optical resonator.

According to another feature of the invention, the optical parametric oscillator/laser system can include a harmonic generator located within the laser resonator such that the laser radiation has a wavelength $\lambda_p$ and the optical parametric oscillator resonator interacts with photons having a wavelength $\lambda_p/2$ generated by the harmonic generator.

According to a further feature of the invention, the dual optical resonator can be doubly resonant. In this embodiment, the dual optical resonator includes a phase conjugate mirror for providing a variable path length resonator. The phase conjugate mirror can comprise a stimulated Brillouin scattering gas cell or a barium titanate crystal.

According to a further feature of the invention, the system can include an oscillator as described above and an amplifier for receiving the laser radiation and the parametric optical radiation generated in the embedded dual optical resonator of the oscillator. The amplifier comprises spaced-apart mirrors which define an optical cavity, an optical parametric oscillator/laser material coaxially disposed within the optical cavity and a pump source for providing pump radiation to the OPOL material in the optical cavity. The laser radiation and the parametric optical radiation are coupled through one of the mirrors to the optical cavity of the amplifier.

In a first embodiment of the oscillator/amplifier system, the OPOL material in the oscillator and the OPOL material in the amplifier have the same composition and are cut along the same crystallographic axis such that the laser radiation and the parametric optical radiation are amplified by the amplifier.

In a second embodiment of the oscillator/amplifier system, the OPOL material in the oscillator and the OPOL material in the amplifier have the same composition but are cut along different crystallographic axes such that the laser radiation is amplified by the amplifier and generates parametric optical radiation at a second parametric wavelength in the amplifier.

According to another aspect of the invention, there is provided an optical parametric oscillator/laser system comprising an optical pump source for generating pump radiation and an optical parametric oscillator/laser crystal that is elongated along a predetermined crystal axis. The crystal is responsive to the pump radiation to generate laser radiation and is responsive to the laser radiation to generate parametric optical radiation. The OPOL system further comprises a first end cap disposed at a first end of the OPOL crystal, the first end cap having first and second surfaces for reflecting the laser radiation and the parametric optical radiation, and a second end cap disposed at a second end of the OPOL crystal, the second end cap having third and fourth surfaces for reflecting the laser radiation and the parametric optical radiation. The first, second, third and fourth surfaces are selected and positioned such that the laser radiation and the parametric optical radiation traverse a closed loop path. The OPOL crystal and the end caps define an optical resonator.

The laser radiation and the optical parametric radiation traverse a closed loop path within the OPOL crystal and the end caps. The OPOL system is triply resonant.

The first and second end cap typically comprise optical crystals, and the first, second, third and fourth surfaces internally reflect the laser radiation and the parametric optical radiation. The first and second end caps can be integrally formed as part of the OPOL crystal or can be separate crystals attached to the OPOL crystal. The first, second, third and fourth surfaces are preferably formed by cutting the end cap crystals at predetermined angles relative to the crystallographic axes thereof. The OPOL crystal can comprise an optical parametric oscillator crystal doped with ions which exhibit lasing transitions. according to an important feature of the invention, the optical parametric oscillator/laser is provided with means for tuning the triply resonant optical resonator so as to vary the wavelength of the parametric optical radiation.

BRIEF DESCRIPTION OF THE DRAWINGS

For a better understanding of the present invention, together with other and further objects, advantages and capabilities thereof, reference is made to the accompanying drawings which are incorporated herein by reference and in which.

DETAILED DESCRIPTION OF THE INVENTION

Figure 1:
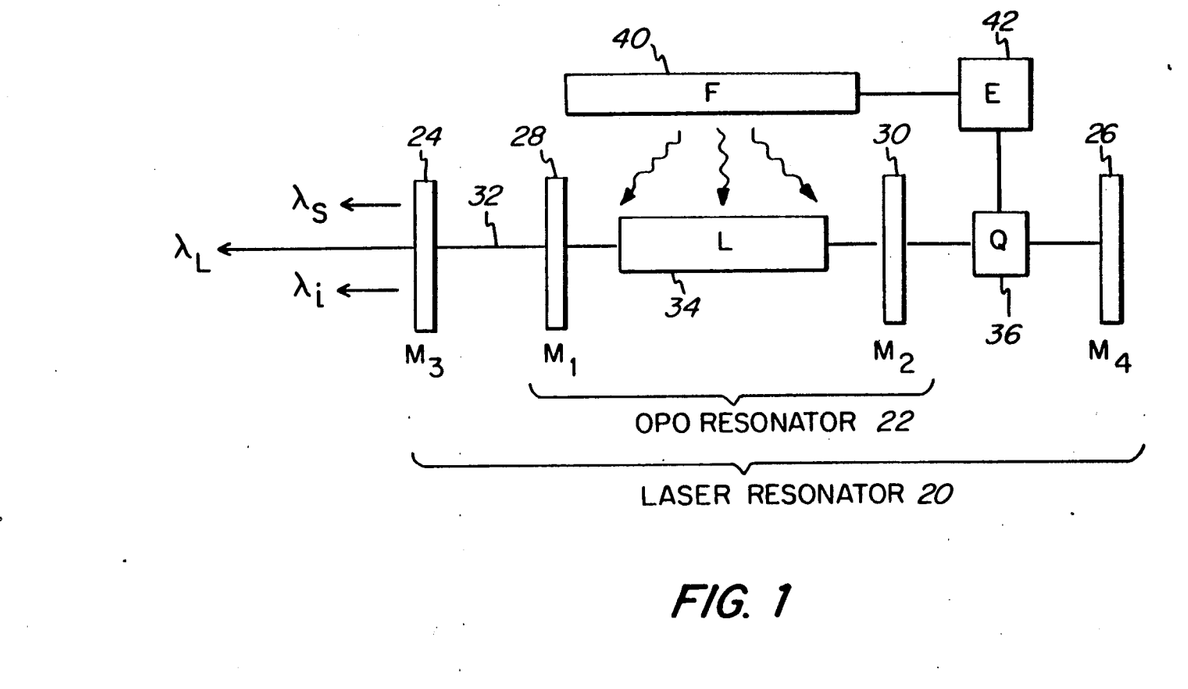
FIG. 1 is a schematic diagram of an optical parametric oscillator/laser system in accordance with a first embodiment of the invention.

A schematic diagram of an optical parametric oscillator/laser (OPOL) system in accordance with a first embodiment of the present invention is shown in FIG. 1. An embedded dual optical resonator includes a laser resonator 20 and an optical parametric oscillator resonator 22. The laser resonator 20 includes a laser resonator mirror 24 and a laser resonator mirror 26 which are spaced apart to define an optical cavity between them. The optical parametric oscillator (OPO) resonator 22 includes an OPO mirror 28 and an OPO mirror 30 which are spaced apart to define an optical cavity between them. The laser resonator 20 and the OPO resonator 22 have a common optical axis 32. The OPO resonator 22 is contained entirely within the laser resonator 20. Thus, the cavity region between OPO mirrors 28 and 30 is common to laser resonator 20 and OPO resonator 22. An OPOL rod 34 of an optical parametric oscillator/laser material is positioned in the common cavity region of the dual optical resonator between OPO mirrors 28 and 30. By positioning the rod 34 in the common cavity region, the rod 34 is located within both OPO resonator 22 and laser resonator 20. The composition of the OPOL rod 34 is described in detail below.

Additional elements of the OPOL system include a Q-switch 36 located in the laser resonator 20 between laser mirror 26 and OPO mirror 30, and an optical pump source 40 positioned to direct pump radiation at the OPOL rod 34. An electronics unit 42 provides power and control signals to the Q-switch 36 and the optical pump source 40. The OPOL system is typically operated in atmosphere. When one of the output wavelengths is strongly absorbed by air, the OPOL system can be operated in a suitable nonabsorbing gas.

The OPOL system shown in FIG. 1 is a self pumping, nonlinear optical device which operates as both a laser and as an optical parametric oscillator. The OPOL system can produce coherent laser radiation at any wavelength in the electromagnetic spectrum at which an optical parametric oscillator can operate and can be tuned over that wavelength range.

In operation, the pump source 40 provides pump photons to the OPOL rod 34. The OPOL rod 34 is an optical parametric oscillator material which has been doped with ions which can undergo lasing transitions. As the pump photons are absorbed, the lasing ions are excited into an inverted population state as with a conventional solid state laser. As laser oscillation begins, the laser photons oscillate between laser mirrors 24 and 26. When the laser photons reach a predetermined parametric threshold, some of the laser photons interact with the crystalline structure of the OPOL rod 34 to produce parametric photons. As long as the laser photon flux remains above the parametric threshold, parametric oscillation takes place between OPO mirrors 28 and 30. The parametric threshold and therefore the depletion rate of the laser photons can be controlled by varying the reflectivity of mirror 28, which functions as a parametric output coupler. The OPOL system produces three wavelengths: the laser wavelength $\lambda_L$, a parametric signal wavelength $\lambda_s$ and a parametric idler wavelength $\lambda_i$. Depending on the requirements of a particular application, one or more of these wavelengths may be extracted from the OPOL system.

The laser resonator mirrors 24 and 26 and OPO mirrors 28 and 30 are important components of the OPOL system. The laser resonator mirror 26 is a total reflector and can be flat or curved, depending on the cavity configuration. The laser resonator mirror 24 is an output coupler for the OPOL system and reflects most of the laser energy back into the cavity. In many applications of the OPOL system, the mirror 24 reflects all of the laser energy but is transmissive to the parametric photons. The OPO resonator mirror 30 is transmissive at the laser wavelength and is a total reflector to one or both of the parametric wavelengths. The OPO resonator mirror 28 is an output coupler. Typically, the mirror 28 is 70%-80% reflective of one of the parametric wavelengths. However, in some cases, all or part of the other parametric wavelength is reflected by mirror 28.

The pump source 40 can be a flash lamp, a diode array or another laser for providing the necessary pump photons to the OPOL rod 34. The pump radiation can be focused on the OPOL rod 34 with a suitable lens arrangement (not shown) if necessary. The Q-switch 36 can be a rotating mirror, an acousto-optic switch, or any other suitable optical switching device. The electronics unit 42 provides electrical power to the pump source 40 and the Q-switch 36. Typically, the electronics unit 42 triggers the pump source 40 and then triggers the Q-switch 36 a few nanoseconds later to activate laser operation.

The OPOL rod 34 is an important component of the OPOL system. In general, the material of the OPOL rod 34 is a material that produces parametric oscillation and also undergoes lasing. Typically, the OPOL material is a crystalline substance which has demonstrated parametric oscillation and which is doped with an ion which undergoes lasing transitions in the crystalline matrix. The doped ion is usually a rare earth ion such as neodymium, samarium, holmium, or erbium, or metal ions such as chromium or titanium. The crystalline host material can be deuterated L-arginine phosphate (d LAP), beta barium borate (BBO), neodymium yttrium aluminum borate (NYAB), lithium niobate (LiNbO$_3$), lithium borate (LBO), potassium titanium phosphate (KTP), or any other inorganic or organic material which has demonstrated parametric oscillation. The crystalline rod 34 is cut with respect to the crystalline optical axis to produce phase matching between the laser photons and the parametric photons. For example, in the case of neodymium-doped lithium niobate, the lasing of neodymium produces photons at 1.084 micrometers (see T. Y. Fan et al, *J. Opt. Soc. Am. B*, Vol. 3, No. 1, January 1986, pp. 140-147). The optical axis, when oriented at 46° with respect to the Y-Z plane, produces Type 1 phase matching and thus parametric photons at 1.5 micrometers and 3.3 micrometers.

Figure 2:
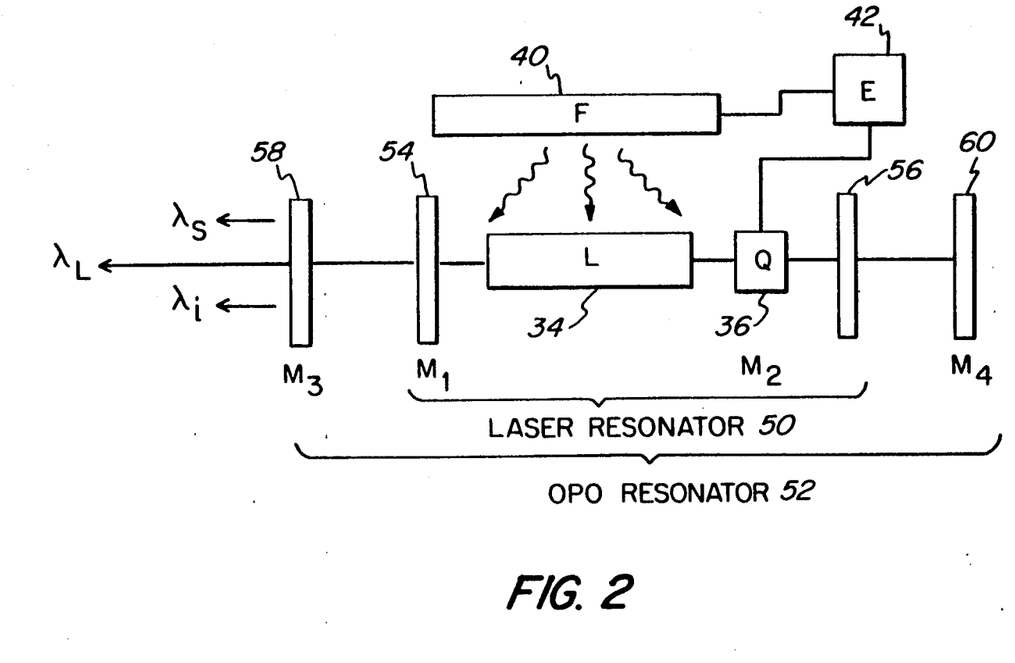
FIG. 2 is a schematic diagram of an optical parametric oscillator/laser system in accordance with a second embodiment of the invention.

A schematic diagram of a second embodiment of the OPOL system of the present invention is shown in FIG. 2. The OPOL system of FIG. 2 includes a dual optical resonator comprising a laser resonator 50 and an OPO resonator 52. The laser resonator 50 includes laser resonator mirrors 54 and 56, which are spaced apart to define an optical cavity between them. The OPO resonator 52 includes OPO mirrors 58 and 60, which are spaced apart to define an optical cavity between them. As compared with the OPOL system of FIG. 1, the laser resonator mirrors 54 and 56 are interchanged with the OPO mirrors 58 and 60. Thus, the laser resonator 50 is located within the OPO resonator 52. The OPOL rod 34 and Q-switch 36 are located in the region between laser resonator mirrors 54 and 56 which is common to laser resonator 50 and OPOL resonator 52. The components of the OPOL system of FIG. 2 can be the same as the components described above in connection with FIG. 1. The operation of the OPOL system of FIG. 2 is generally the same as that of the system of FIG. 1.

Figure 3:
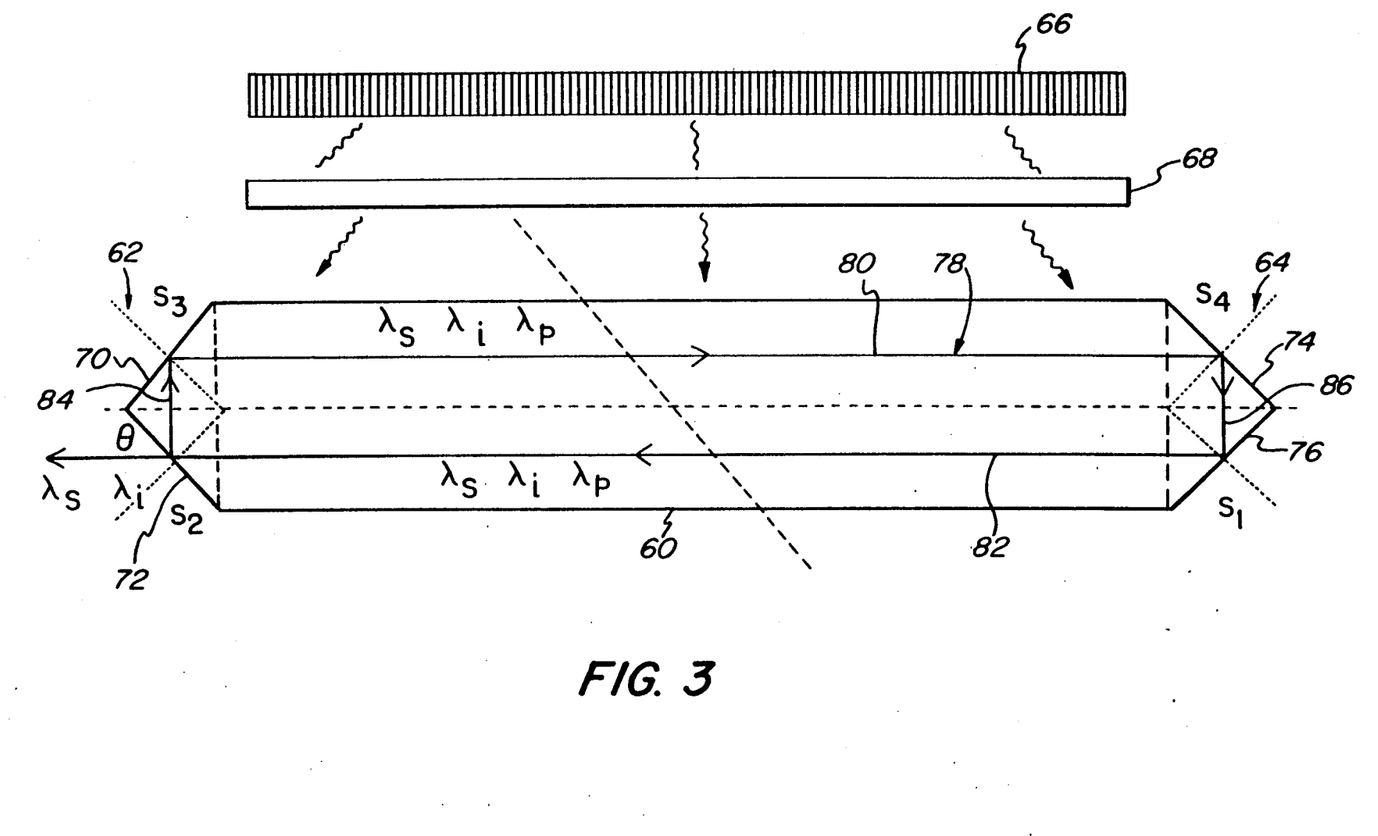
FIG. 3 is a schematic diagram of a triply resonant optical parametric oscillator/laser system.

A schematic diagram of a third embodiment of an optical parametric oscillator/laser system in accordance with the present invention is shown in FIG. 3. No external mirrors are required in the OPOL system of FIG. 3. An OPOL rod 60 comprises a material capable of optical parametric oscillation and lasing transitions as described above in connection with OPOL rod 34. An end cap 62 is disposed at one end of OPOL rod 60, and an end cap 64 is disposed at the other end of OPOL rod 60. The end caps 62 and 64 can be separate elements or can be integrally formed as a part of OPOL rod 60. An optical pump source 66 provides pump radiation to OPOL rod 60. The pump radiation is focused on OPOL rod 60 by a cylindrical lens 68.

The end cap 62 includes surfaces 70 and 72 which internally reflect laser radiation and optical parametric radiation generated within OPOL rod 60. End cap 64 includes surfaces 74 and 76 which internally reflect laser radiation and optical parametric radiation. The surfaces 70, 72, 74 and 76 may have coatings to insure that the desired reflection occurs. The surfaces 70, 72, 74 and 76 are each oriented at an angle, such as 45° or the Brewster angle, with respect to the optical axis of the OPOL rod 60 so as to reflect radiation in a closed loop within OPOL rod 60. The coatings on the surfaces 70, 72, 74 and 76 are selected to reflect the laser radiation and the optical parametric radiation generated within OPOL rod 60, except that one of the surfaces, such as surface 72, designated as an output of the OPOL system is partially reflective at the desired output wavelength. Laser radiation and optical parametric radiation generated within OPOL rod 60 are reflected by surfaces 70, 72, 74 and 76 to form a closed loop path, or ring, 78 within the OPOL rod 60. The closed loop path 78 traversed by the laser photons and the OPOL photons includes sections 80 and 82 along the length of the OPOL rod and sections 84 and 86 within end caps 62 and 64, respectively. The sections 84 and 86 are perpendicular to sections 80 and 82. The sections 80 and 82 are parallel to a selected nonlinear axis of the OPOL material so that generation of laser photons and optical parametric oscillation takes place along these sections.

The pump source 66 stimulates generation of laser photons within the OPOL rod 60. The laser photons circulate in a ring along the path 78 defined by sections 80, 82, 84 and 86. When the laser photons reach the parametric oscillation threshold, OPO photons at signal and idler wavelengths are generated. The OPOL photons also circulate around the closed loop path 78 within the OPOL rod 60 and end caps 62, 64. One of the surfaces 70, 72, 74 or 76 can be coated to act as an output coupler for the wavelength of interest. Because the OPOL system shown in FIG. 3 is resonating at the laser wavelength, the signal wavelength and the idler wavelength, the system is said to be triply resonant.

The OPOL system of FIG. 3 is self-walkoff compensating because, as the photons circulate, the ring is symmetric with respect to the refractive optical axis. As the laser and parametric photons traverse one section of the ring, they "walk" away from each other and on the other section, they merge.

Figure 4:
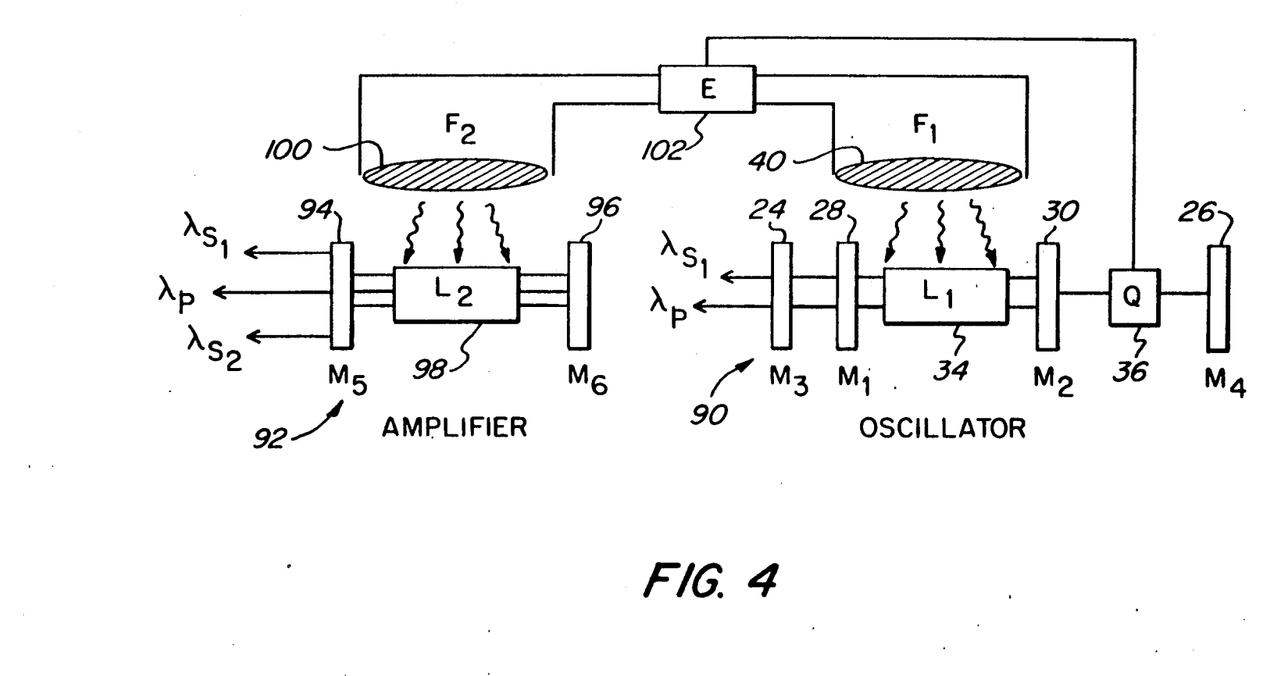
FIG. 4 is a schematic diagram of an optical parametric oscillator/laser system in an oscillator/amplifier configuration.

The OPOL system of the present invention can be utilized in an oscillator/amplifier system as shown in FIG. 4. An oscillator 90 is constructed in the same manner as the OPOL system shown in FIG. 1 and described hereinabove. The outputs of the oscillator 90, including a laser wavelength $\lambda_p$ and OPO wavelength $\lambda_{s1}$, are supplied to an amplifier 92. The amplifier 92 includes mirrors 94 and 96, which are spaced apart to define an optical cavity. An OPOL rod 9 is positioned within the optical cavity between mirrors 94 and 96. The OPOL rod 98 is an optical parametric oscillator/laser material capable of both parametric oscillation and lasing transitions as described above. An optical pump source 100 provides pump radiation to the OPOL rod 98. An electronics unit 102 provides control signals and operating power to pump source 100 of amplifier 92 and to pump source 40 and Q-switch 36 of oscillator 90.

In a first embodiment of the oscillator/amplifier system, the OPOL material in rod 98 is cut to the same crystallographic axis as the OPOL material in rod 34. In this case, the amplifier 92 simply amplifies the outputs of the oscillator 90 at wavelengths $\lambda_p$ and $\lambda_{s1}$.

In a second embodiment of the oscillator/amplifier system, the OPOL material in rod 98 is cut to a crystallographic axis that is different from the cut of the OPOL material of rod 34. In this case, the parametric output from oscillator 90 at wavelength $\lambda_{s1}$ passes through the OPOL rod 98 unaffected. However, the laser radiation at wavelength $\lambda_p$ is amplified and a second parametric photon at wavelength $\lambda_{s2}$ is generated. In this case, the oscillator/amplifier system generates two parametric photons which are coaxial and simultaneous. The output of the amplifier 92 can be provided to one or more additional amplifiers with a similar construction. In this manner, an amplifier chain can be constructed which generates several wavelengths.

Figure 5:
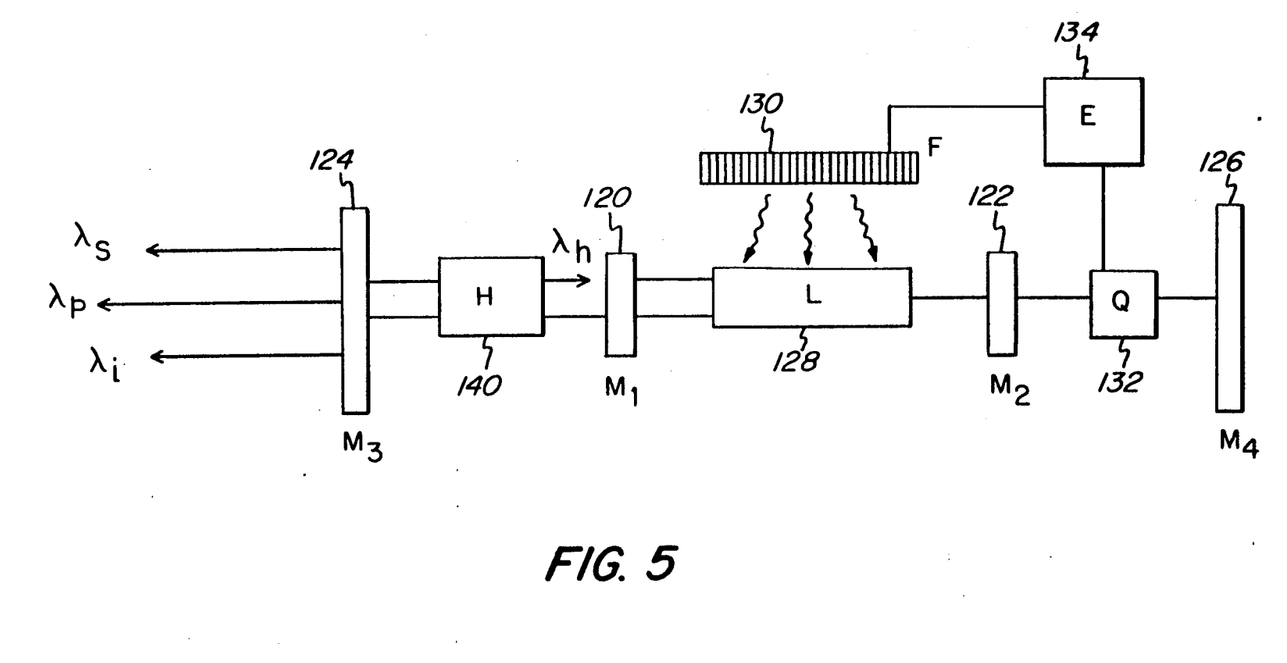
FIG. 5 is a schematic diagram of an optical parametric oscillator/laser system using a harmonic generator.

In the OPOL systems shown in FIGS. 1-3 and described above, the parametric output is at longer wavelengths than the laser wavelength. A schematic diagram of an optical parametric oscillator/laser system which operates at wavelengths shorter than the laser wavelength is shown in FIG. 5. An OPOL resonator includes spaced-apart OPO mirrors 120 and 122. A laser resonator includes spaced-apart laser mirrors 124 and 126. As described above in connection with FIG. 1, the OPOL resonator and the laser resonator are coaxial and have a common cavity region in which an OPOL rod 128 is located. An optical pump source 130 is positioned to direct pump radiation at OPOL rod 128. A Q-switch 132 is disposed between mirrors 122 and 126 within the laser resonator. An electronics unit 134 supplies power and control signals to pump source 130 and Q-switch 132. A harmonic generator 140 is positioned in the laser resonator between laser mirror 124 and OPO mirror 120. The harmonic generator 140 can be a nonlinear harmonic crystal such as potassium deuterium phosphate (KD*P), BBO or LBO.

The operation of the OPOL system shown in FIG. 5 is similar to operation of the system shown in FIG. 1 except as follows. The laser photon at wavelength $\lambda_p$ is shifted by the harmonic generator 140 to a wavelength of $\lambda_p/2$. The OPO mirrors 120 and 122 are designed to pass the photons at wavelength $\lambda_p/2$. The OPOL material of rod 128 is cut to Thus, the optical parametric oscillator interacts with the photons at wavelength $\lambda_p/2$ but not the photons at the laser wavelength $\lambda_p$. Laser resonator mirror 126 is a total reflector of the laser wavelength. Laser resonator mirror 124 reflects all or part of the laser wavelength and the doubled laser frequency. Mirror 124 is transparent to the parametric wavelengths. OPO resonator mirrors 120 and 122 are transparent to the laser and harmonically generated wavelengths. Mirror 122 is a total reflector of the signal and/or idler parametric wavelengths. Mirror 120 is the OPO output coupler and is 60% or more reflective at the signal wavelength or the idler wavelength.

As an example of the OPOL system shown in FIG. 5, when the harmonic generator 140 is neodymium-doped beta barium borate (BBO) cut between 23.5° and 24.5°, the output wavelength is between 1.5 micrometers and 2.7 micrometers (the absorption cutoff of the borate). When the neodymium-doped BBO is cut between 21° and 23°, the OPO interacts with the 532 nanometer photon and can be tuned from 0.68 micrometers to 2.7 micrometers by rotating the crystal.

Figure 6:
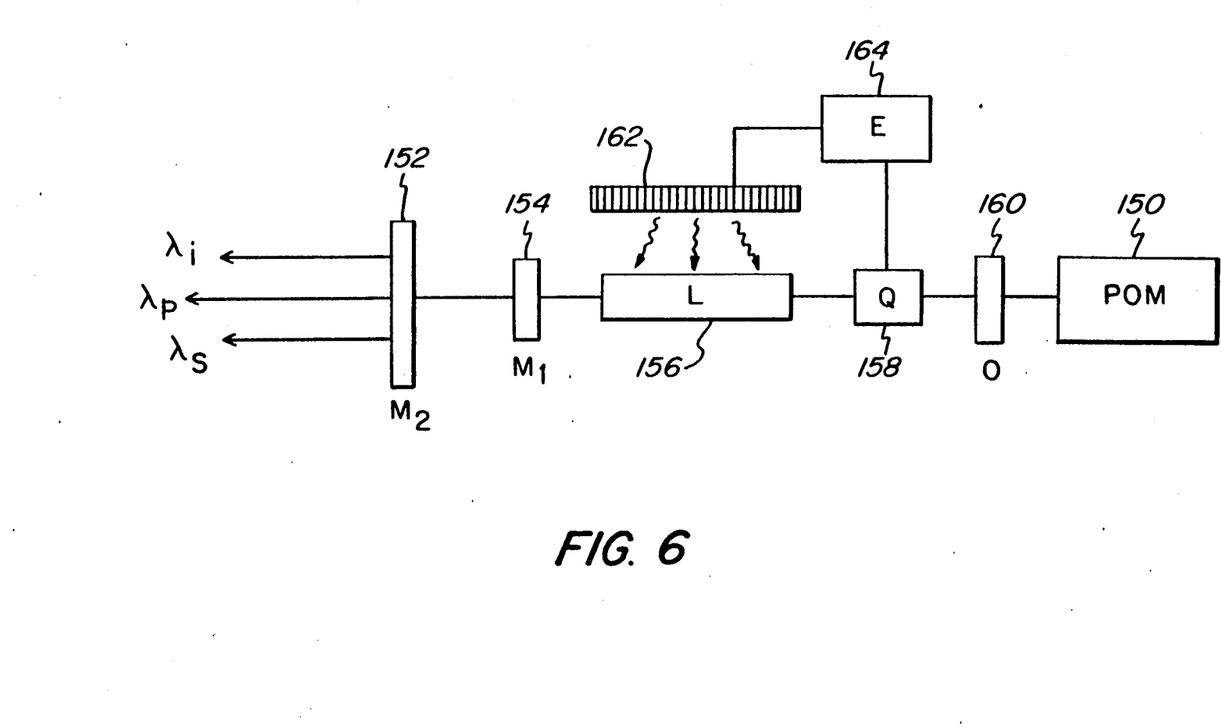
FIG. 6 is a schematic diagram of a doubly resonant optical parametric oscillator/laser system.

A schematic diagram of a doubly resonant parametric oscillator/laser system is shown in FIG. 6. This system provides a lower parametric oscillator threshold and corrects for aberrations in the OPOL material. The system of FIG. 6 uses a phase conjugate mirror 150 as part of a dual optical resonator. A laser resonator is defined by the phase conjugate mirror 150 and a laser mirror 152. An optical parametric oscillator resonator is defined by the phase conjugate mirror 150 and an OPO mirror 154. The laser resonator and the OPO resonator have a common cavity region between OPO mirror 154 and phase conjugate mirror 150 in which an OPOL rod 156 is located. Also located within the common cavity region between mirror 154 and phase conjugate mirror 150 are a Q-switch 158 and conditioning optics 160. An optical pump source 162 is positioned to direct pump radiation at OPOL rod 156. An electronics unit 164 supplies power and control signals to the pump source 162 and the Q-switch 158.

Lasers are typically run as singly resonant oscillators. The optical parametric oscillator is rarely run as a doubly resonant oscillator as a result of the broad line width of the OPO and mode hopping. Such mode hopping occurs because in a doubly resonant oscillator, both the signal and the idler wavelengths are resonating. Therefore, the cavity must be an oscillator for both the signal and the idler wavelengths, and the cavity length must be an even multiple of both the signal and idler wavelengths. Typically, either the signal or idler wavelength dominates, thus causing the OPO to wavelength hop. It is difficult to get both the signal and idler wavelengths to oscillate together in a stable manner.

The phase conjugate mirror 150 allows the optical parametric oscillator signal and idler wavelengths to oscillate freely and independently of each other. The phase conjugate mirror 150 acts as part of a variable path length resonator. The conditioning optics 160, which is typically a focusing lens or a focusing lens assembly, focuses the laser wavelength, the OPO signal wavelength and the OPO idler wavelength into the medium of the phase conjugate mirror 150. The phase conjugating medium reflects the three wavelengths at different depths with in the phase conjugate mirror. Thus, the resonator can be an even multiple of the signal and idler wavelengths. The phase conjugate mirror 150 can be a stimulated Brillouin scattering gas cell (such as $CH_4$) or a crystal such as barium titanate. By providing an OPOL with a doubly resonant oscillator cavity as shown in FIG. 6, the threshold at which parametric oscillation begins is greatly reduced. As a result, a continuous wave OPOL system can be constructed.

Figure 7:
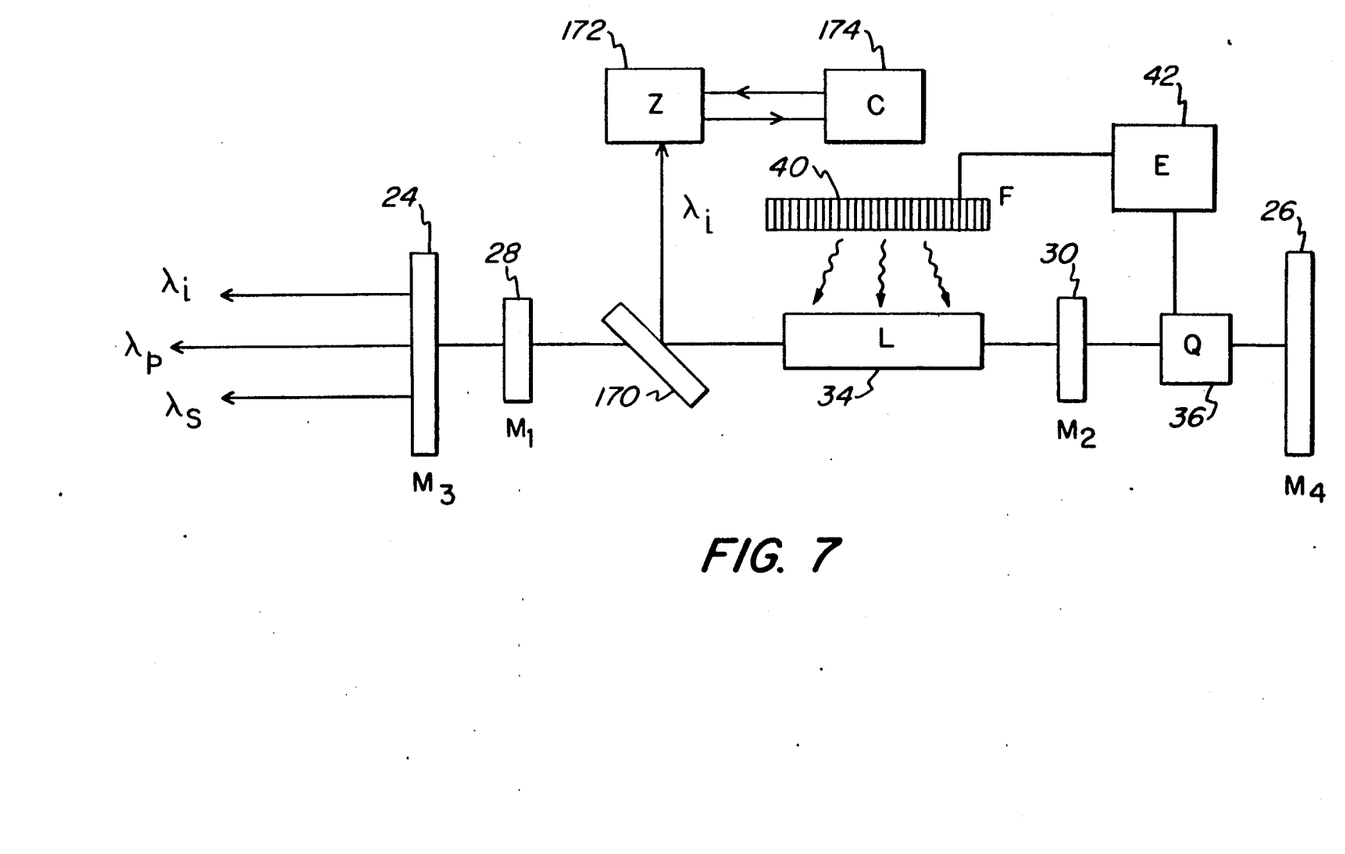
FIG. 7 is a schematic diagram of an optical parametric oscillator/laser system including means for linewidth narrowing.

By its nature, an optical parametric oscillator has a relatively broad bandwidth. The optical parametric oscillator/laser system of the present invention also has a relatively broad bandwidth. Therefore, line narrowing may be desirable in some situations. A schematic diagram of a line narrowed optical parametric oscillator/laser system is shown in FIG. 7. The system of FIG. 7 is similar to the system of FIG. 1, with the addition of means for line narrowing. Like elements in FIGS. 1 and 7 have the same reference numerals. A beam splitter 170 is positioned within the OPO resonator between OPO mirror 28 and OPOL rod 34. The beam splitter 170 is designed to reflect a portion of either the signal or idler wavelength from the cavity. The beam splitter 170 allows the working wavelength, either the signal or the idler, to propagate without substantial loss.

The wavelength reflected by the beam splitter 170 is directed to a line narrowing optical system 172. A line width control electronic unit 174 is connected to the line narrowing optical system 172. The optical system 172 can be a simple grating, etalon, birefringent tuner or an acousto-optic Bragg cell. The Bragg cell has the most flexibility since, by changing the operating frequency of the Bragg cell, the diffraction grating line width and therefore the linewidth of the OPOL line can be varied. The narrowed OPOL line is directed back into the OPOL cavity and acts as a seed to narrow the other wavelength which is not directed to the line narrowing optics. Further details regarding line narrowing of an optical parametric oscillator are described in commonly owned application Ser. No. 07/706,753, filed May 29, 1991, which is hereby incorporated by reference.

One of the major advantages of the optical parametric oscillator/laser system of the present invention is that tuning can be achieved in a single solid state device. Tuning techniques include mechanical, thermal, electro-optic and photoelastic. Mechanical tuning can be achieved by using wedge prisms of appropriate material (such as quartz, ZnSe, CaF, etc. or by angle tuning mechanisms. The wedge prisms can be displaced, either manually or electronically, across the beam in the optical cavity to achieve tuning.

Figure 8:
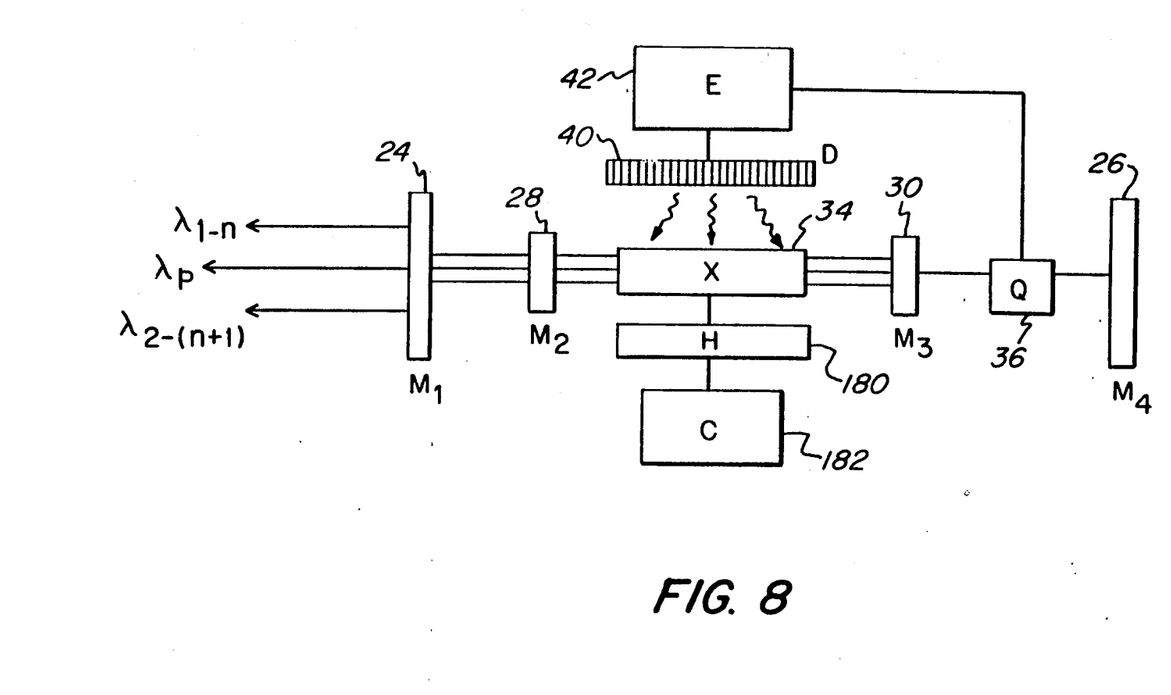
FIG. 8 is a schematic diagram of a tunable optical parametric oscillator/laser system using thermal control of the OPOL crystal.

A schematic diagram of a tunable optical parametric oscillator/laser system using thermal tuning control is shown in FIG. 8. The OPOL system of FIG. 8 is similar to the OPOL system shown in FIG. 1 and described above except that thermal tuning has been added. Like elements in FIGS. 1 and 8 have the same reference numerals. A crystal heater 180 is positioned near the OPOL rod 34. The heater 180 is connected to a heater control 182. The OPOL system is tuned by heating the OPOL rod 34. By heating the crystal, the phase matching properties change, thus allowing the OPOL system to be tuned. A material that is tunable by heating is neodymium-doped lithium niobate.

Figure 9:
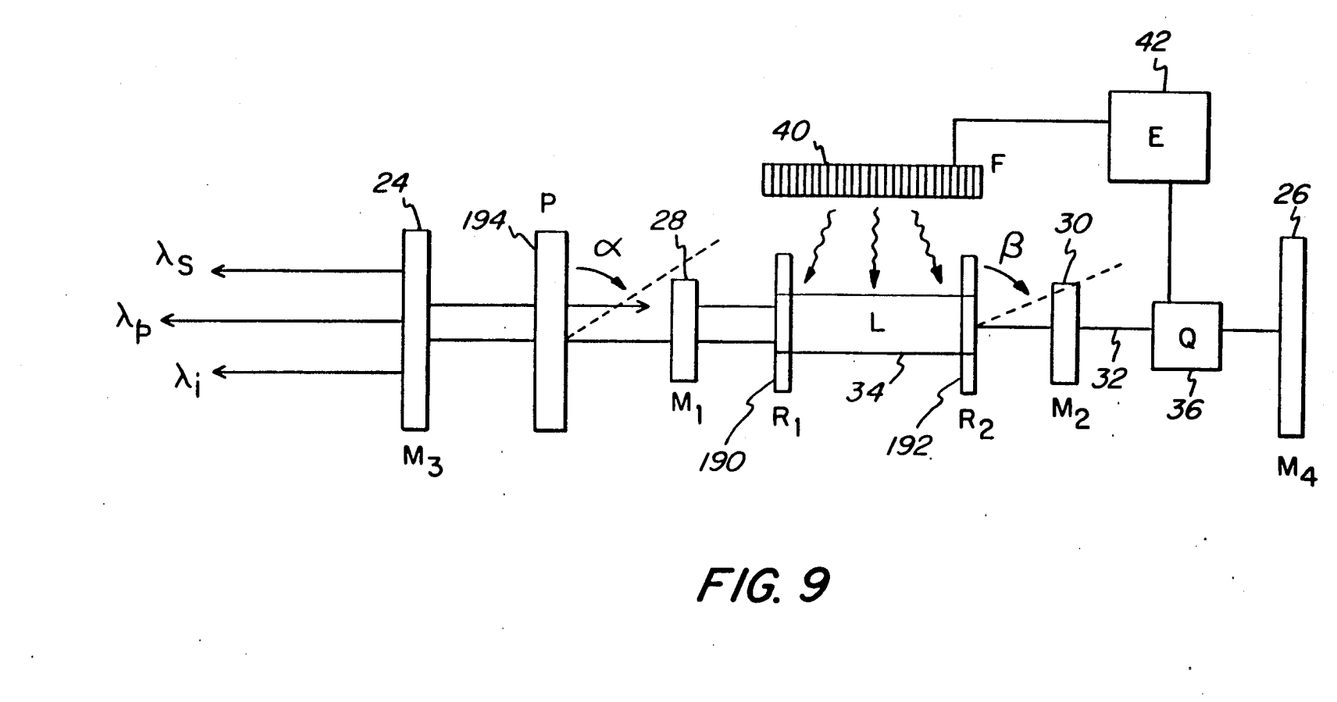
FIG. 9 is a schematic diagram of a tunable optical parametric oscillator/laser system using angular tuning of the OPOL crystal.

A schematic diagram of a tunable optical parametric oscillator/laser system using angular tuning is shown in FIG. 9. The OPOL system of FIG. 9 is similar to the OPOL system of FIG. 1 except that means for angular tuning has been added. Like elements in FIGS. 1 and 9 have the same reference numerals. Rotation collars 190 and 192 are attached to opposite ends of OPOL rod 34. The rotation collars 190 and 192 permit the OPOL rod 34 to be rotated about the optical axis 32 of the laser resonator. The crystal of the OPOL rod 34 is cut to interact and phase match with the laser wavelength. A polarizer 194 is positioned between laser mirror 24 and OPL mirror 28. The polarizer 194 rotates the laser wavelength and aids in phase matching. The polarizer 194 can be a standard optical polarizer or a liquid crystal polarizer. The polarizer 194 provides a rotation angle $\alpha$, and the OPOL rod provides a rotation angle $\beta$. Angular tuning as shown in FIG. 9 permits tuning of OPOL crystals which cannot be temperature tuned. Also, tuning is faster with angular tuning as shown in FIG. 9 as compared with temperature tuned systems.

According to another angle tuning technique, the OPOL rod is rotated about an axis that is perpendicular to the optical axis of the laser resonator.

Electro optic tuning can be achieved by attaching electrodes to the appropriate surfaces of the OPOL rod and applying a voltage to change the refractive index. Photoelastic tuning is achieved by the application of external pressure to the OPOL crystal.

A triply resonant optical parametric oscillator/laser system wherein the OPOL crystal is fabricated to operate both as a ring laser and an OPO is shown in FIG. 3 and described above. The triply resonant optical parametric oscillator/laser shown in FIG. 3 can be tuned as any other optical parametric oscillator by angle tuning or temperature tuning. In angle tuning, the lasing axis remains fixed relative to the pump source. However, within the crystal, the lasing axis moves relative to the crystallographic axis. Thus, the laser photons see a different optical axis and different parametric photons are formed.

Figure 10:
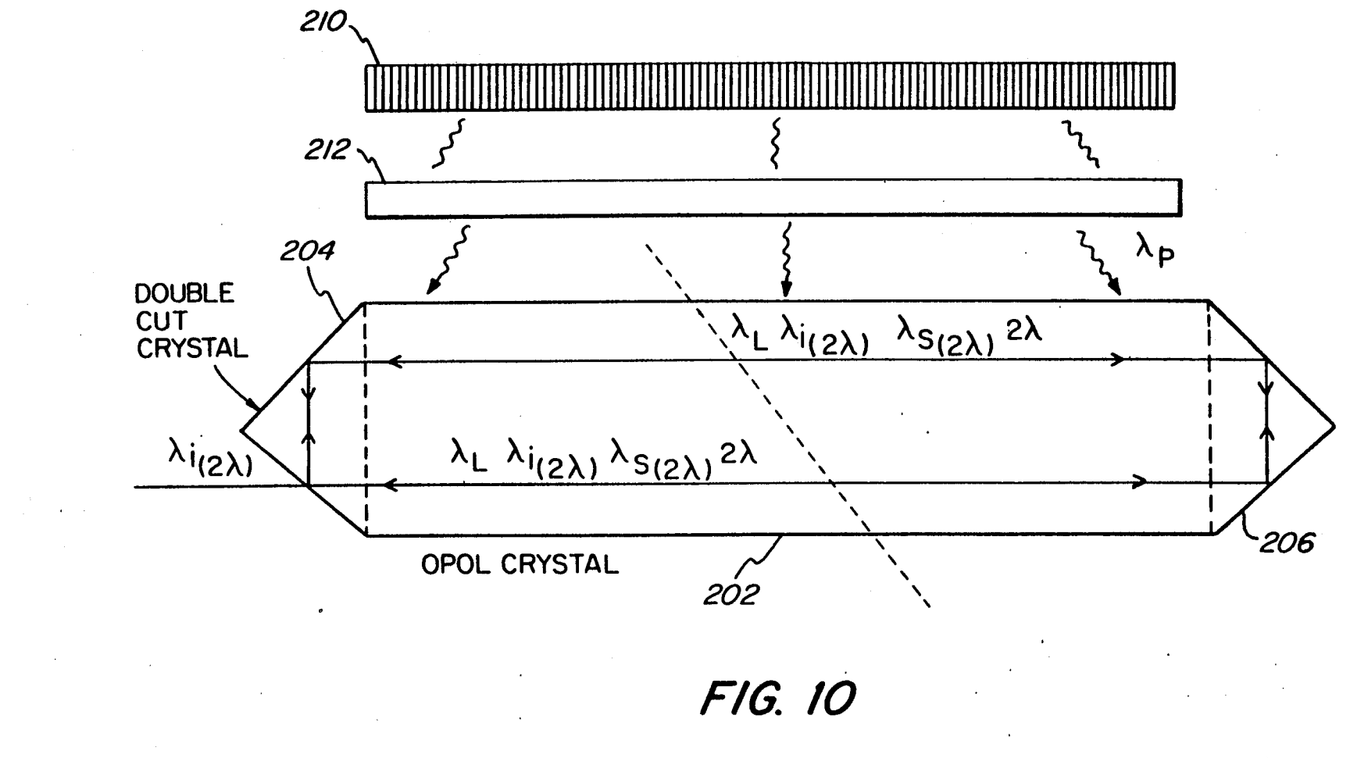
FIG. 10 is a schematic diagram of a triply resonant optical parametric oscillator/laser system wherein the parametric frequencies are doubled.

The end caps of the triply resonant OPOL do not perform any lasing or parametric function other than to guide the respective photons on part of the closed loop path. Thus, the end caps can be used to perform a variety of additional functions. A triply resonant OPOL wherein the end caps act as doublers is shown in FIG. 10. An OPOL rod 202 has end caps 204 and 206 attached to opposite ends thereof. An optical pump source 210 directs pump radiation through a cylindrical lens 212 to the OPOL rod 202. One of the end caps 204, 206 doubles the laser frequency. The laser photon is upconverted and the doubled photons interact with the OPO material in OPOL rod 202. Thus, the laser frequency is upshifted and the OPO output wavelength is shorter than the pump wavelength.

In another embodiment, one end cap doubles the laser frequency and the other end cap doubles either the signal or the idler frequency. For example, $CR^{+3}$ doped beta barium borate can be pumped to lase at 694 nanometers. One end cap doubles the 694 nanometers to 348 nanometers. The OPOL rod 202 interacts with the 348 nanometers to produce tunable radiation including signal frequency from 410 nanometers to 680 nanometers, and idler wavelengths from 680 nanometers to 2.7 micrometers. The second end cap doubles the signal frequency such that tunable ultraviolet radiation from 205 nanometers to 340 nanometers is produced.

Figure 11:
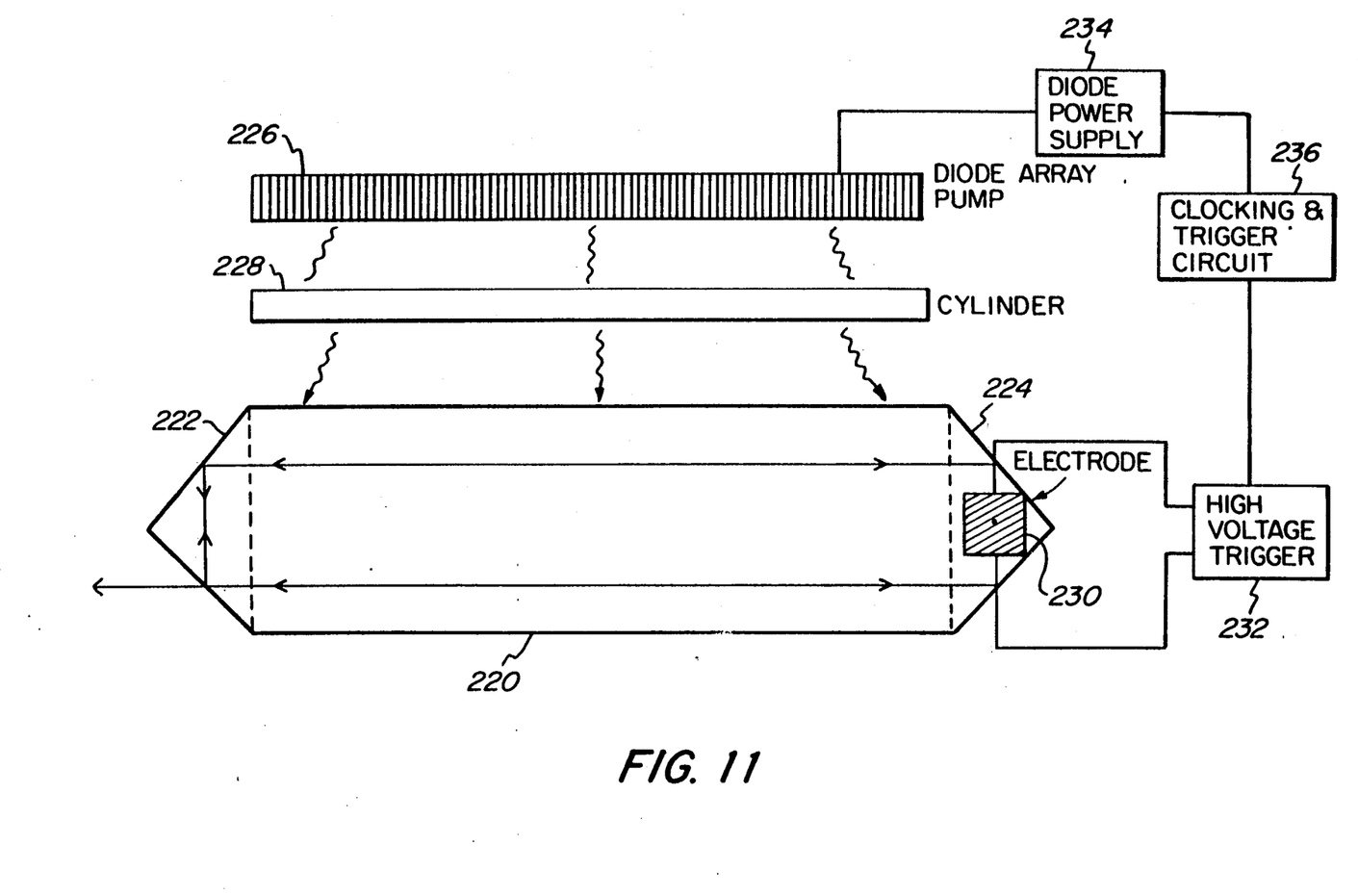
FIG. 11 is a schematic diagram of a triply resonant optical parametric oscillator/laser system including Q-switching of the optical resonator.

A schematic diagram of a Q-switched, triply resonant optical parametric oscillator/laser system is shown in FIG. 11. An OPOL rod 220 has end caps 222 and 224 attached to opposite ends thereof. An optical pump source 226 directs pump radiation through a cylindrical lens 228 to OPOL rod 220. The end caps 222 and 224 have surfaces which internally reflect the laser photons and the parametric photons in a closed loop ring as described above in connection with FIG. 3. In this case, the OPOL rod 220 and the end caps are lithium niobate. An electrode 230 is attached to the top surface of end cap 224, and a similar electrode (not shown) is attached to the bottom surface of end cap 224. By applying a suitable voltage to the electrodes, Q-switching is effected. A high voltage trigger 232 applies a suitable trigger voltage between the electrode 230 and the bottom electrode. A diode power supply 234 applies electrical power to a diode array laser pump source 226. A clocking and trigger circuit 236 synchronizes the operation of pump source 226 and the Q-switch. The end caps can perform additional functions such as line narrowing and scanning of the OPOL system output using a Bragg cell scanner.

The end caps of the triply resonant OPOL system shown in FIGS. 3, 10 and 11 can be separate crystals attached to the OPOL rod or can be integrally formed as part of the OPOL rod. When the end caps are integrally formed as part of the OPOL rod, the end caps can have the same properties as the OPOL rod or can have different properties from the OPOL rod. Different properties are obtained by varying the crystal composition during the crystal growing process.

The optical parametric oscillator/laser system of the present invention is a continuously tunable multi-wavelength source of coherent radiation. Thus, the OPOL system can replace a dye laser in its entirety as well as provide superior performance and tuning range. The OPOL system is useful in all applications which involve coherent light. Furthermore, the continuous tuning capability opens new dimensions in the design and development of optical systems.

The OPOL tool is valuable for spectroscopic work to study fundamental processes. The OPOL enhances the prospects for design, development and characterization of conventional and unconventional optical devices. In communications, the OPOL can be used as a source for signal preparation transmission, multiplexing, modulation, scanning and storage of information. The capabilities of sensor optics are expanded by the OPOL. The OPOL is expected to be a useful tool in the development of communication devices, optical computers, medical devices and the like.

While there have been shown and described what are at present considered the preferred embodiments of the present invention, it will be obvious to those skilled in the art that various changes and modifications may be made therein without departing from the scope of the invention as defined by the appended claims.

What is claimed is:

1. An optical parametric oscillator/laser system comprising:

an optical pump source for generating pump radiation;

an embedded dual optical resonator comprising a laser resonator and an optical parametric oscillator resonator, said laser resonator and said optical parametric oscillator resonator being coaxial and having a common cavity region; and an optical parametric oscillator/laser material coaxially disposed within the common cavity region of said laser resonator and said optical parametric oscillator resonator, and responsive to said pump radiation to generate laser radiation and responsive to said laser radiation to generate parametric optical radiation.

2. An optical parametric oscillator/laser system as defined in claim 1 wherein said laser resonator is defined by a first pair of spaced-apart mirrors located on opposite sides of the optical parametric oscillator/laser material relative to each other, and said optical parametric oscillator resonator is defined by a second pair of spaced-apart mirrors located on opposite sides of the optical parametric oscillator/laser material relative to each other.

3. An optical parametric oscillator/laser system as defined in claim 1 wherein said laser resonator is disposed within said optical parametric oscillator resonator.

4. An optical parametric oscillator/laser system as defined in claim 1 wherein said optical parametric oscillator resonator is disposed within said laser resonator.

5. An optical parametric oscillator/laser system as defined in claim 1 wherein said optical resonator further includes means for Q-switching of said laser resonator.

6. An optical parametric oscillator/laser system as defined in claim 1 wherein said optical resonator includes means for coupling one or more of said laser radiation and said parametric optical radiation therefrom as outputs.

7. An optical parametric oscillator/laser system as defined in claim 1 wherein said material comprises an optical parametric oscillator crystal doped with ions which exhibit lasing transitions.

8. An optical parametric oscillator/laser system comprising:

an optical pump source for generating pump radiation;

an imbedded dual optical resonator comprising a laser resonator and an optical parametric oscillator resonator, said laser resonator and said optical parametric oscillator resonator being coaxial and having a common cavity region;

an optical parametric oscillator/laser material coaxially disposed within the common cavity region of said laser resonator and said optical parametric oscillator resonator, and responsive to said pump radiation to generator laser radiation and responsive to said laser radiation to generator parametric optical radiation; and a harmonic generator located within said laser resonator such that said laser radiation has a wavelength $\lambda_p$ and said optical parametric oscillator resonator interacts with photons having a wavelength $\frac{1}{2} \lambda_p$.

9. An optical parametric oscillator/laser system as defined in claim 1 wherein said optical resonator is doubly resonant.

10. An optical parametric oscillator/laser system comprising:

an optical pump source for generating pump radiation;

an imbedded dual optical resonator comprising a laser resonator and an optical parametric oscillator resonator, said laser resonator and said optical parametric oscillator resonator being coaxial and having a common cavity region; and an optical parametric oscillator/laser material coaxially disposed within the common cavity region of said laser resonator and said optical parametric oscillator resonator, and responsive to said pump radiation to generator laser radiation and responsive to said laser radiation to generator parametric optical radiation, wherein said optical resonator is doubly resonant and includes a phase conjugate mirror for providing a variable path resonator.

11. An optical parametric oscillator/laser system as defined in claim 10 wherein said phase conjugate mirror comprises a stimulated Brillouin scattering gas cell.

12. An optical parametric oscillator/laser system as defined in claim 10 wherein said phase conjugate mirror comprises a barium titanate crystal.

13. An optical parametric oscillator/laser system as defined in claim 1 further including means for narrowing the linewidth of said parametric optical radiation.

14. An optical parametric oscillator/laser system as defined in claim 1 further including means for tuning said optical parametric oscillator/laser material so as to vary the wavelength of said parametric optical radiation.

15. An optical parametric oscillator/laser system as defined in claim 14 wherein said means for tuning includes means for thermal control of said material.

16. An optical parametric oscillator/laser system as defined in claim 14 wherein said means for tuning includes means for rotating said material about an axis perpendicular to the optical axis of said dual optical resonator.

17. An optical parametric oscillator/laser system as defined in claim 14 wherein said means for tuning includes a polarizer disposed in said laser resonator and means for rotating said material about the optical axis of said dual optical resonator.

18. An optical parametric oscillator/laser system as defined in claim 1 wherein said parametric optical radiation includes a signal wavelength and an idler wavelength.

19. An optical parametric oscillator/laser system comprising:

an optical pump source for generating pump radiation;

an imbedded dual optical resonator comprising a laser resonator and an optical parametric oscillator resonator, said laser resonator and said optical parametric oscillator resonator being coaxial and having a common cavity region; and an optical parametric oscillator/laser material coaxially disposed within the common cavity region of said laser resonator and said optical parametric oscillator resonator, and responsive to said pump radiation to generator laser radiation and responsive to said laser radiation to generator parametric optical radiation, and an amplifier for receiving the laser radiation and the parametric optical radiation generated in said embedded dual optical resonator, said amplifier comprising spaced-apart mirrors defining an optical cavity, an optical parametric oscillator/laser material coaxially disposed within said optical cavity and a pump source for providing pump radiation to the OPOL material in said optical cavity, the laser radiation and the parametric optical radiation being coupled through one of said mirrors to the optical cavity of said amplifier.

20. An optical parametric oscillator/laser system as defined in claim 19 wherein the OPOL material in said embedded dual optical resonator and the OPOL material in said amplifier have the same composition and are cut along the same crystallographic axis such that the laser radiation and the parametric optical radiation are amplified by said amplifier.

21. An optical parametric oscillator/laser system as defined in claim 19 wherein the OPOL material in said embedded dual optical resonator and the OPOL material in said amplifier have the same composition and are cut along different crystallographic axes such that the laser radiation is amplified by said amplifier and generates parametric optical radiation at a second parametric wavelength in said amplifier.

22. An optical parametric oscillator/laser system comprising:

an optical pump source for generating pump radiation;

an optical parametric oscillator/laser crystal that is elongated along a predetermined crystal axis, said crystal being responsive to said pump radiation to generate laser radiation and responsive to said laser radiation to generate parametric optical radiation;

a first end cap disposed at a first end of said crystal, said first end cap having first and second surfaces for reflecting said laser radiation and said parametric optical radiation; and a second end cap disposed at a second end of said crystal, said second end cap having third and fourth surfaces for reflecting said laser radiation and said parametric optical radiation, said first, second, third and fourth surfaces being selected and positioned such that said laser radiation and said parametric optical radiation traverse a closed loop path, said crystal and said end caps defining an optical resonator.

23. An optical parametric oscillator/laser system as defined in claim 2 wherein said first and second end caps comprise optical crystals and wherein said first, second, third and fourth surfaces provide internal reflection of said laser radiation and said parametric optical radiation.

24. An optical parametric oscillator/laser system as defined in claim 23 wherein said first and second end caps are integrally formed as part of said optical parametric oscillator/laser crystal.

25. An optical parametric oscillator/laser system as defined in claim 24 wherein said first, second, third and fourth surfaces are formed by cutting said optical parametric oscillator/laser crystal at predetermined angles relative to the crystallographic axes thereof.

26. An optical parametric oscillator/laser system as defined in claim 22 wherein one of said end caps includes mean for Q-switching said optical resonator.

27. An optical parametric oscillator/laser system as defined in claim 22 wherein one of said end caps includes means for narrowing the linewidth of said laser radiation or said parametric optical radiation.

28. An optical parametric oscillator/laser system as defined in claim 22 wherein one of said end caps includes means for doubling the frequency of said laser radiation.

29. An optical parametric oscillator/laser system as defined in claim 22 further including means for focusing said pump radiation on said optical parametric oscillator/laser crystal.

30. An optical parametric oscillator/laser system as defined in claim 22 wherein said crystal comprises an optical parametric oscillator crystal doped with ions which exhibit lasing transitions.

31. An optical parametric oscillator/laser system as defined in claim 22 further including means for tuning said optical resonator so as to vary the wavelength of said parametric optical radiation.

32. An optical parametric oscillator/laser system as defined in claim 31 wherein said means for tuning includes means for thermal control of said crystal.

33. An optical parametric oscillator/laser system comprising:

an optical pump source for generating pump radiation;

a laser resonant cavity defined between first and second laser mirrors;

an optical parametric oscillator resonant cavity defined between first and second OPO mirrors, said laser resonant cavity and said optical parametric oscillator resonant cavity having a common optical axis and having a common cavity region; and a single optical parametric oscillator/laser crystal coaxially disposed within said common cavity region and responsive to said pump radiation to generate laser radiation and responsive to said laser radiation to generate parametric optical radiation at a signal wavelength and an idler wavelength.

34. An optical parametric oscillator/laser system comprising:

an optical pump source for generating pump radiation;

an optical parametric oscillator/laser crystal responsive to the pump radiation to generate laser radiation, and responsive to the laser radiation to generate parametric optical radiation at a signal wavelength and an idler wavelength;

a laser resonant cavity defined between first and second laser mirrors located on opposite sides of the optical parametric oscillator/laser crystal relative to each other; and an optical parametric oscillator resonant cavity defined between first and second OPO mirrors located on opposites sides of the optical parametric oscillator/laser crystal relative to each other, the laser resonant cavity and the optical parametric oscillator resonant cavity defining a common cavity region.

* * * * *